(12) United States Patent
Fraser et al.

(10) Patent No.: US 9,760,399 B1
(45) Date of Patent: Sep. 12, 2017

(54) DYNAMIC PROCESS MANAGEMENT

(71) Applicant: Amazon Technologies, Inc., Reno, NV (US)

(72) Inventors: Thomas Grant Fraser, Edmonds, WA (US); Timothy Daniel Clark, Seattle, WA (US); Shah Pavel Jamal, Seattle, WA (US); Anderson Kailodge Quach, Seattle, WA (US); Vincent Edward Bannister, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/660,508

(22) Filed: Mar. 17, 2015

(51) Int. Cl.
*G06F 9/46* (2006.01)
*G06F 9/48* (2006.01)

(52) U.S. Cl.
CPC .................................. *G06F 9/485* (2013.01)

(58) Field of Classification Search
None
See application file for complete search history.

(56) References Cited

U.S. PATENT DOCUMENTS

| | | | |
|---|---|---|---|
| 2004/0034855 A1* | 2/2004 | Deily | G06F 17/30893 718/102 |
| 2004/0111725 A1* | 6/2004 | Srinivasan | G06F 9/4856 718/105 |
| 2007/0050777 A1* | 3/2007 | Hutchinson | G06F 11/0709 718/104 |
| 2012/0144219 A1* | 6/2012 | Salahshour | G06F 1/3203 713/322 |
| 2012/0324481 A1* | 12/2012 | Xia | G06F 9/485 719/320 |
| 2013/0173513 A1 | 7/2013 | Chu et al. | |

OTHER PUBLICATIONS

Co-pending U.S. Appl. No. 14/566,251, filed Dec. 10, 2014.

* cited by examiner

*Primary Examiner* — Sisley Kim
(74) *Attorney, Agent, or Firm* — Pierce Atwood LLP

(57) ABSTRACT

The performance of a device can be improved by intelligently terminating (or otherwise operationally adjusting) applications, services, or processes that the user is unlikely to access on the device. Information such as system event data and hint data can be obtained from various sources and fed to one or more predictor algorithms, which can determine the likelihood that a user will access various applications over a period of time. Other determinations can be made as well, such as which applications are most likely causing degradation in performance. Various termination actions can be selected to be performed, which can in some cases adjust the applications selected for termination by an operating system of the device. Once a set of actions is selected, those termination actions can be performed for the associated application(s) at least to the extent needed to restore health of the device.

18 Claims, 9 Drawing Sheets

DYNAMIC PROCESS MANAGEMENT

BACKGROUND

People are utilizing computing devices for an ever-increasing variety of tasks. This increase not only results in more applications and functions executed by the devices, but also increases the complexity and size of the applications that execute on these devices. Further, many users expect to be able to keep many of these applications open and executing concurrently on a given device. This can lead to various performance issues on the device, such as slow operation due to lack of available processing and/or memory capacity, as well as problems with overheating or battery drainage, among other such issues. While some conventional approaches can terminate processes in certain situations, the terminations typically are not done in an intelligent way that will minimize the impact on usage of the device.

BRIEF DESCRIPTION OF THE DRAWINGS

Various embodiments in accordance with the present disclosure will be described with reference to the drawings, in which.

DETAILED DESCRIPTION

Figure 1A:
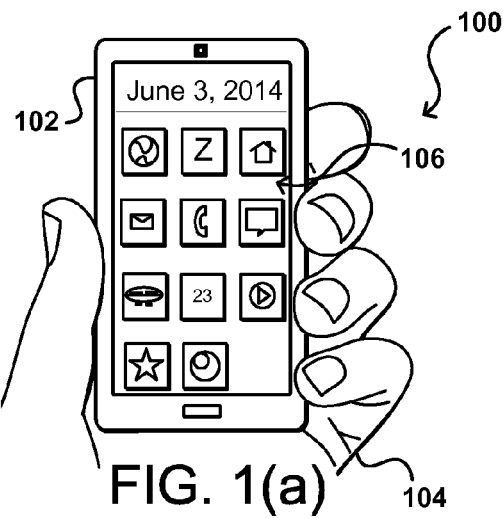
FIGS. 1(a), 1(b), 1(c), and 1(d) illustrate a conventional process for activating an application of interest that can be utilized in accordance with various embodiments.

Systems and methods in accordance with various embodiments of the present disclosure overcome one or more of the above-referenced and other deficiencies in conventional approaches to managing applications and other functionality on a computing device. In particular, various embodiments determine the values of various operational parameters of a computing device. These operational parameters can include, for example, temperature, available memory, processor usage, number of concurrently executing applications, number of open connections, and the like. If the value of any of these operational parameters falls outside a specified range, or at least approaches a threshold value, etc., an attempt can be made to maintain (or regain) a healthy operational state of the device. In at least some embodiments, values such as the operational parameter values and thresholds are used to algorithmically compute and/or make a determination as to a healthy state of the device. Usage patterns of a user, as well as state information for a computing device, can be monitored to attempt to determine whether it might be beneficial to terminate an application or service, as well as which application or service is likely to have the least impact on the operation of the computing device and/or the user experience based upon predicted behavior by the user and/or device. Information such as system event data and hint data can be obtained from various sources, which then can be aggregated and fed to one or more predictor algorithms to determine the likelihood that a user will access an application for the current situation, or context. Determinations also can be made as to the background processes or other processes or functionality that will be required for those applications. In some embodiments, the predictor algorithms will rank at least some of the applications and/or services by likelihood, or can provide a probability or confidence that a specific application or service will be utilized for the current context. There can be various termination actions that can be performed for different applications or services, and the selection of which actions to perform can be based at least in part upon the state of the device. In some embodiments different types of termination actions can be performed based upon state of the device or other such information. These can include actions of a first type that terminate, kill, or cleanup applications or processes on the device, or actions of a second type that throttle, slow, or otherwise adjust the operation of applications or processes on the device, among other such options. Other actions can be provided as well, such as an option to uninstall an application or process from the device. The state of the device can include, for example, the availability of resources such as processing capacity, memory cache, amount of memory used by each application or process, number of applications currently running on the device, number and/or types of connections, battery life or charge, device temperature, the dropping of frames (i.e., reduction in framerate or failure to display a subset of frames of a game or video on the device), background processor usage, presence of orphaned processes (e.g., processes associated with an application that is no longer executing on the device), binder usage, and the like.

Once a set of termination actions is selected, at least some of those actions can be performed to adjust the operation and/or execution of the associated application(s) and/or service(s). The actions can include, for example, completely terminating an application, deleting cached image data, terminating connections, throttling an operational state of an application to a specified state, and other such actions. The actions can also include terminating or otherwise operationally modifying the execution of processes (or sub-processes) that are determined to be operating in an irregular or unexpected fashion, or that are determined to be orphaned or no longer assisting open applications executing (or likely to be executing) on the device. The termination of misbehaving or orphaned processes can be performed in response to a determination that a device is experiencing performance issues, for example, or as part of a pro-active process for maintaining optimal device performance independent of the current state of the device, among other such options. Such approaches can help to maintain healthy operation of the device, with an acceptable temperature and other such physical properties, running services for applications to be executed, as well as adequate available resources for anticipated usage. The termination decision algorithms can consider and determine state data in order to ensure that the process does not negatively impact the performance of the device. The determination of applications or services that can be terminated can begin as a static selection based upon data from multiple users, but over time can become customized for specific users and/or devices based upon patterns of usage and other such information.

Other variations, functions, and advantages are described and suggested below as may be provided in accordance with the various embodiments.

Figures 1B, 1C:
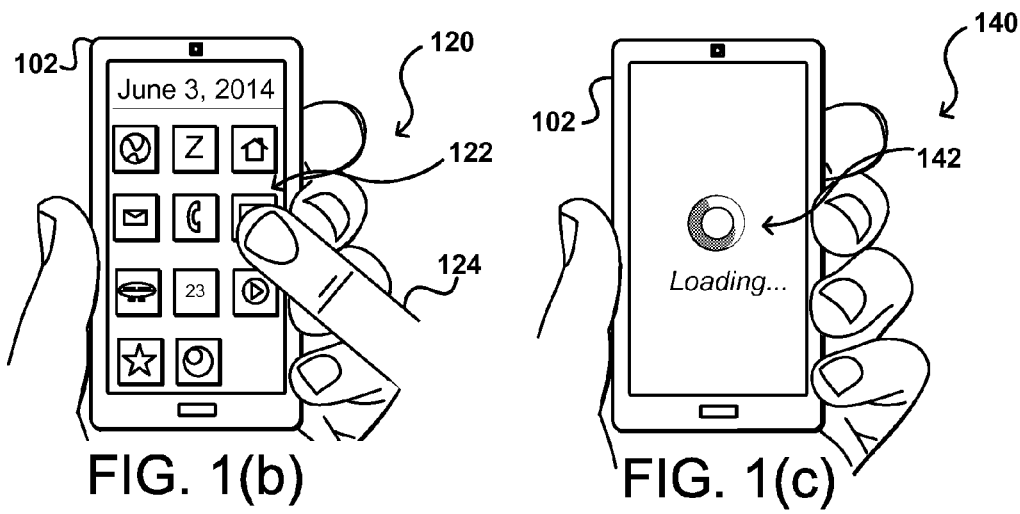

FIG. 1(a) illustrates an example situation 100 wherein a user is able to select a graphical icon in order to launch an application in accordance with various embodiments. In this example, the user is holding a computing device 102, in this example a smart phone, in the user's left hand 104. Various other types of computing devices can be utilized as well, such as tablet computers, notebooks, wearable computers (e.g., smart watches and glasses), and the like. The computing device 102 includes a touchscreen on which is displayed a set of graphical icons, each associated with a respective application (or task or function, etc.). If the user wants to launch (or otherwise access) one of the applications (or access a resource, content, task, or other option associated with an icon or element), the user can use a finger 124 to touch the touchscreen at a location associated with the icon 122 for that application, as illustrated in the example situation 120 of FIG. 1(b). In this example, the icon is displayed using a subset of pixels of the touchscreen, and a capacitive touch sensor can determine that the finger was brought into contact (or sufficient proximity) with the touchscreen in a region associated with at least a subset of those pixels. As known for selection of a graphical icon, however, various other approaches can be used, such as may involve using a cursor, gesture, or stylus, among other such options.

Figure 1D:
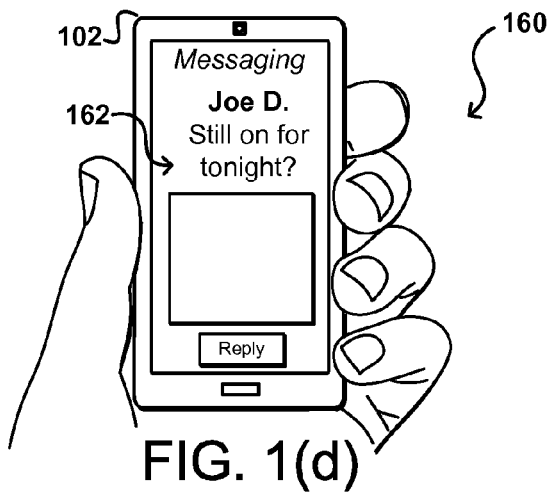

In response to the user selecting the icon 122 (or otherwise indicating an instruction to launch the application), the device can launch, execute, or otherwise bring into focus the indicated application. Almost all applications will take some amount of time to launch, execute, or otherwise get to the state where the graphics for the application are visible on the display and the application is ready for user interaction. In many cases this may be on the order of milliseconds, such that the user barely notices any delay. In other cases, however, there can be a significant delay before the application is ready for use. As illustrated in the example situation 140 of FIG. 1(c), one or more graphics 142 and/or text may be displayed indicating that the application is in the process of loading, launching, etc. After a period of time, the application interface 162 can be available for use, as illustrated in the example situation 160 of FIG. 1(d). When an application routinely takes seconds to be available, or takes an extended period of time to perform certain functions, it can negatively impact the user experience. Further, routine delays may cause the user to not use that application, or even that device, which can negatively impact sales as well. In many cases, a user experiencing frequent delays may decide that a newer device is needed. The need to frequently purchase new devices can also be undesirable for the user, and can potentially cause the user to switch brands, which can be bad for the manufacturer.

Various other performance issues can exist that can negatively impact the user experience. For example, frames of video or other content might frequently be dropped on the device. The device might be caused to overheat. The amount of processing and/or memory capacity might be such that overall performance of any executing application can be degraded. A number of connections might be maintained that can prevent the user from establishing additional connections for other applications. Many of these issues can be the result of the number of applications and/or services executing on the device. Devices such as mobile computing devices typically have limited resources that are managed by the operating system (OS). While the OS will generally attempt to keep as many applications and services in resident memory as possible, conventional approaches dictate that when an application needs to be killed due to device performance issues, the OS will typically kill applications based upon how recently that application was last accessed. This does not take into account the importance of the application or how likely that application is to be accessed (or not accessed) in the near future. Further, a conventional OS will not interrupt applications that are misbehaving, such that single applications can perform unexpectedly and negatively impact things like device performance, fluidity, battery life, and network consumption, among other such aspects.

Accordingly, approaches in accordance with various embodiments attempt to perform at least some termination actions, or otherwise modify the operation of applications, processes, or services, in order to attempt to maintain system health based on information known for the user as well as the device state and context, among other such information. As used herein, a "termination" action will be used broadly to refer to any action that causes an application or service to operate at less than a typical or conventional level, such as by fully terminating a service, throttling the service, deleting data cached for the service, slowing the execution of the service, and the like. For example, based on a given context a determination might be made with high confidence that a user will use a specific action in the near future, such that the application and any related services should not be terminated at the current time, or at least should be moved back in the priority list in order to cause applications and/or services that are less likely to be access to be more likely to be terminated at the present time. The decisions can be made using information across multiple dimensions, as may include user history, time, location, device state, executing applications, and the like. Such approaches can help to maintain device health while avoiding negative impacts experienced when applications are killed despite the intentions of the user.

As mentioned, resources on devices, and in particular mobile or portable devices, can be relatively limited, but it may not be practical to terminate various applications or services in certain contexts. Thus, a state of the device can be determined in some embodiments to assess an extent to which termination can be utilized on the device at a given time, as the amount of available resources can change due to factors such as the number and types of applications running, the types of connections (e.g., LAN or Wi-Fi) being utilized, types of functions or tasks being performed, etc. Further, approaches in accordance with various embodiments can perform termination actions with priority for applications that have been determined to be the least likely to be accessed (or most likely to not be accessed over a period of time). In some embodiments, attempts can be made to determine (or update) which applications are least likely to be accessed for a particular context, as may relate to a current user, location, time of day, history of usage, and the like. Various other such processes can be utilized as well within the scope of the various embodiments.

In some embodiments, a determination can be made as to the applications that are least likely to be accessed on a given type of device. For example, the behavior of multiple users can be analyzed to determine the applications that are most frequently accessed. These can include, for example, a browser on a tablet computer, a music application on a personal media player, a social media application on a smart phone, a reader application on an e-reader, and an email application on a notebook computer, among other such options. In some embodiments there can be a ranking or scoring of the applications such that the lowest ranked applications (or highest ranked if in terms of ability to terminate, etc.) can be terminated or otherwise modified up to a number that may be based at least in part upon the state of the device and the available resources. The ranking or scoring can also be updated over time, and can also be adapted for a particular user or device. For example, a user might use a tablet for reading and infrequently use a browser, or might use the tablet for gaming on weekends but not during the week. Various usage patterns and styles might exist that would enable the least likely applications to be accessed to be determined for a given context and a particular user and device.

Figure 2:
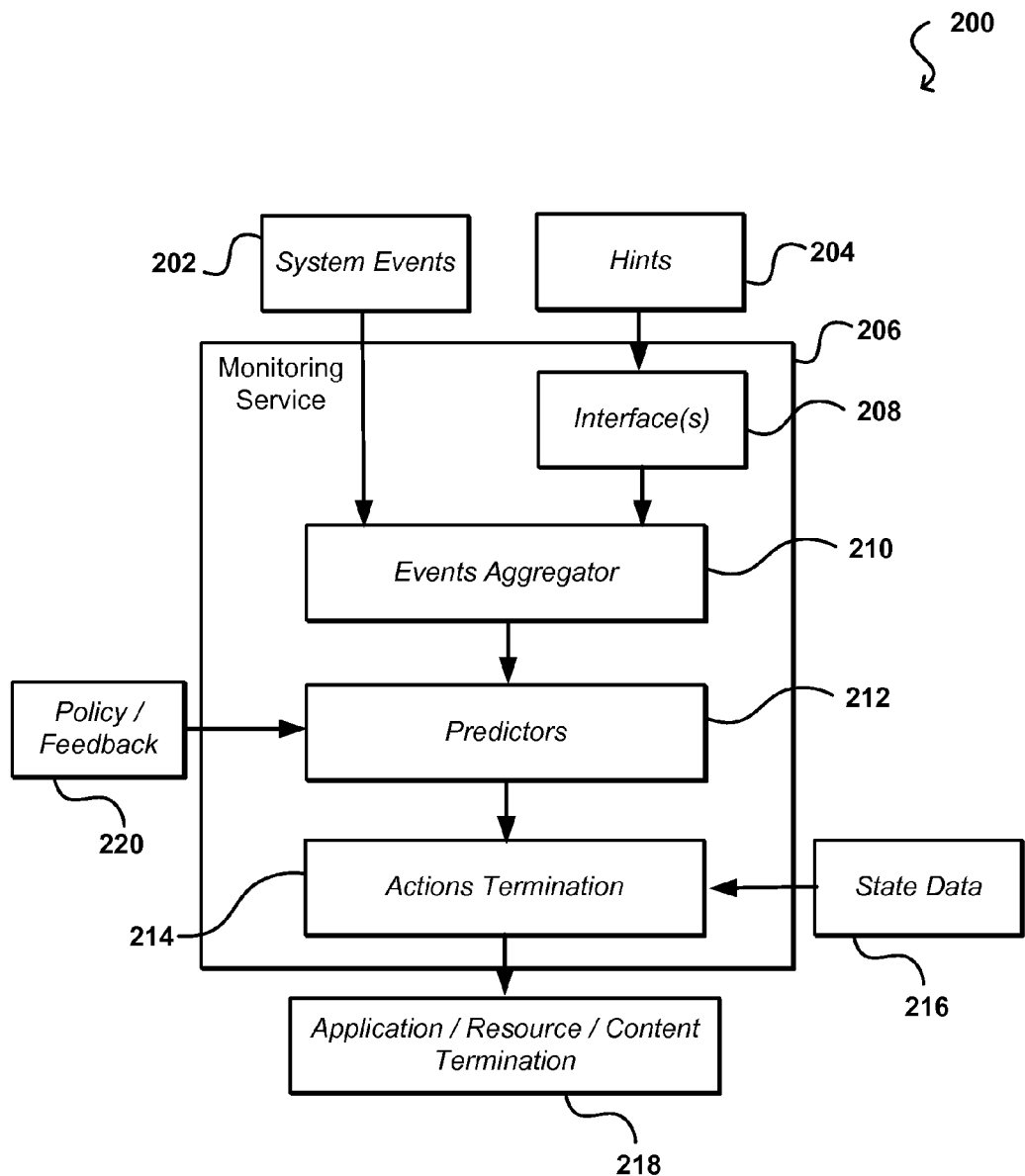
FIG. 2 illustrates a component view of a service capable of determining when it may be beneficial to terminate one or more services, as well as which services to terminate, that can be used in accordance with various embodiments.

FIG. 2 illustrates an example implementation 200 that can be utilized to determine the least likely applications to be accessed (or otherwise needed) for a given context, and determine which of those applications should be terminated, or otherwise operationally modified, for a given state. Such an implementation can also determine the extent to which any or all of those applications should be operationally modified for the current state. It should be understood that the figure shows example components for performing specific tasks on a computing device, but that some of these tasks may be performed by different components on different devices or remote systems within the scope of the various embodiments.

In this example a monitoring service 206 is executing on the computing device. The monitoring service can be part of the operating system, a standalone application, or a remote service, among other such options. The monitoring service 206 is configured to receive context information, which in this example takes the form of system events 202, as may be provided or determinable by the operating system (OS) "passively listening" on the device, and hints 204 provided by the device, an application, or a remote service, etc. The event data can relate to tasks performed by the device that are indicative of what the user is doing, including events such as launching an application, closing an application, minimizing an application, activating the screen, or waking the device from a sleep state. Hints can be received from a hint component on the device, for example, which can monitor application-related activities or actions being performed by the user that can be indicative of what the user might do next, and which might not otherwise be determinable by the OS. These can include information such as may relate to the user capturing an image, going to a home screen, installing an application, downloading an application or content, performing an action on a related device, opening a navigation panel, turning up a volume, etc. As an example, a user downloading an application may be a strong indication that the user is likely to access that application once installed. The monitoring service 206 can include one or more interfaces 208, such as application programming interfaces (APIs) that can receive hints from one or more sources.

The system events 202 and hints 204 can be aggregated using an events aggregator component 210, such as a software module that is able to correlate the different types of information and aggregate the information in a way that can be analyzed by the monitoring service 206. This can include, for example, reformatting, translating, and/or removing redundancy of the received data. Various other processing can be performed as well, as is known for aggregating data from multiple sources. Once the information is aggregated and processed, it can be passed to one or more predictors 212 that can each include at least one prediction algorithm for determining which application(s) are likely to be access by the user, or on behalf of the user, for the current context. The prediction algorithms can utilize various heuristics as discussed in detail elsewhere herein, and can include algorithms such as, for example, nearest neighbor, most recently used, and k nearest neighbors algorithms, as well as the most recently and frequently accessed approaches (among others) discussed elsewhere herein. A predictor such as burst predictor algorithm can also be used, which looks to frequent recent activity as an indicator of likelihood, as some users frequently use an application for a period of time and then very infrequently use that application afterwards. These and/or other such algorithms can compare the context information with information that has been collected previously for the user (and potentially other users), as well as patterns of usage and other such data. The output from the predictors can be a ranked or ordered set of application identifiers, as well as potentially other values such as a likelihood, probability, or confidence value. In some embodiments, termination for an application might only be initiated if a confidence level or likelihood of being accessed over a period of time does not at least meet a minimum threshold value. For example, an application might only be terminated if it not at least 25% or at least 50% likely to be accessed over an upcoming period of time. In some embodiments, the minimum confidence level might be adjustable by the user and/or adjustable based at least in part upon the availability of various resources and/or the state of the device.

Predictors, in at least some embodiments, are components that are configured to collect events from the system in order to develop usage patterns for the user. These patterns can be used to predict what the user is likely to do at any given time with an associated confidence level. These confidence levels can be summed to boost confidence for a certain task, such as an application being accessed. In some embodiments, the predictor might determine which application a user is likely to access based at least in part upon the application that the user is currently accessing via the device. For example, if the user has opened a book library then the user may be likely to next access an e-book reader application. A predictor can also look to burst behavior to determine an application that a user is likely to access. For example, if a user is currently playing a new game or reading a new book, the user is likely to access the corresponding application frequently, which can boost the confidence in that application being accessed. Predictors can also utilize user behaviors related to time. For example, a user might open a news app and a weather app every morning, and might open an email application and calendar application when arriving at work. Accessing of these applications thus can also be predicted based at least in part upon the respective locations, as discussed elsewhere herein. There can be various types of predictor algorithms utilized as well, which may be appropriate in different situations. As discussed, these can include marketing- and campaign-based predictors, which can cause specified applications to be less likely to be terminated, as well as habit- or intention-based predictors, which can terminate based on observed user history. Other types include location-based predictors and most recently used (or statistical) predictors, as well as nearest k or classic data mining predictors. Predictors such as market segment predictors can also be used, which take advantage of information about the user (discussed elsewhere herein) to determine a segment to which the user belongs and weight the appropriate applications more heavily. A best resource fit predictor can also make determinations based upon which termination actions fit within the available resource constraints and provide the most potential value. Various other types can be utilized as well.

In this example, the application identifiers, confidence values, and/or other such information are passed from the predictors 212 to an actions termination module 214. The termination module 214 can also receive state data 216, as may include information about the available memory, processing capacity, bandwidth, connections, and other such information. As discussed, the actions termination module 214 can use information about the state to determine an amount of termination that can be performed without negatively impacting the performance of the device. The actions termination module can then look to the termination actions that can be performed for the identified applications, and determine which of those actions should be taken for the current state and context. The information for the termination actions can then be passed to one or more termination components 218 on the device to cause or instruction the actions to be performed.

As mentioned, different applications can be terminated or otherwise operationally modified in different ways, with each type of termination action leading to different resource (e.g., processor, power, and memory) consumption or device behavior (e.g., amount of heat generated or connections available). Based at least in part upon the predictions and confidence levels, for example, a selection can be determined that balances accessibility with resource cost. Callbacks can be implemented, wherein applications can be notified of termination and confidence levels, enabling those applications to take specific actions that cannot otherwise be automated, such as making network requests. Applications can also be notified of various activities or content that can no longer be loaded or accessed, or other actions that might be advantageously performed to reduce resource consumption. A resource termination module can determine resources that applications will use, and can automatically perform termination actions for those resources once they are no longer needed. A termination action, as discussed herein, can include any action that changes the operation of an application or service in a way that improves the state of the device. Termination actions can include the complete termination, stopping, and/or unloading of an application, process, or background service. Termination actions can also include, for example, deleting files from disk, throttling performance mechanisms, releasing connections, deleting cached OS resources such as bitmaps, unloading Java classes, deleting application views, and deleting names and addresses that the application is unlikely to request in the near future. At least some of the regained memory can be cached in another process, such as a caching service. In many instances background services will be terminated without notification to the corresponding application(s), which would then need to reload or restart the background services as needed. In some embodiments, the applications can be notified or requested to approve the termination, among other such options.

As an example, the monitoring service 206 might determine that a user is least likely to access an e-book reader application, based on the user location and time of day, for example. Accordingly, one or more termination actions might be determined to be performed at the current time, such as to terminate the e-book reader application, cause the application to change to operating in a specific state (such as may correspond to a sleep mode), cause the book content for the application to be deleted from cache, etc. If it is determined that the user is in the process of reading a specific book, an action might also be to determine where the user is in the book and delete content prior to that point, at least up to a determined range of the current point. Any supplemental content might also be deleted as appropriate. In some embodiments, the system state and/or system events data may be used to determine how much termination to be performed for the e-reader application. For example, the free memory state may be relatively low which might cause as much book content to be deleted as possible, as well as to cause the minimal amount of book content to be pre-loaded. Similarly, the CPU state might indicate a relatively full load such that the application may be terminated completely, or reduced in operation to a very minimal operational state. If the screen is off, an additional amount of termination may be performed. A relevant hint might be that the customer tends to access the e-book reader application between seven and ten o'clock at night on weeknights, and due to the current time and the fact that the screen is off the user might be very unlikely to access that application. Other hints might be used as well, such as a user causing a shortcut or icon for the application to be removed from a favorites bar or similar location. Any relevant and available hint and/or event data can be aggregated and analyzed in order to attempt to make accurate predictions and/or determinations, as well as to figure out what type of termination action(s) to perform. The hints can also be updated over time, such that when a user finishes reading an e-book all content related to that book can be unloaded. Other hints or information might be used as well. For example, a user might only ready those books when at home, and may not read when away, driving, etc.

When performing one or more termination actions for an application, the application can be altered to operate in any of various stages as discussed herein. For example, one stage of termination involves treating background or related services or processes utilized by the application but not needed for any other application likely to be accessed in a determined period of time. Another stage of termination involves reducing the number of resources available (allocated memory, CPU capacity, CPU clock speed, etc.) to the application, or instructing the application to change to a state where a reduction in such usage is managed from within the application. Another stage can involve releasing any control over the display screen, connections, or other components or services of the device. Each of these different stages can have different resource requirements, and the stage to which an application is terminated can depend at least in part upon the state data. For different states, an application might be terminated to different stages even for the same device and same user. Various other lifecycle events that can be intercepted and performed can be used as termination stages as well within the scope of the various embodiments.

In some embodiments, the result of the performing of the actions can be monitored in order to make better decisions in the future. For example, terminating a particular application to a particular stage can result in a certain amount of resource consumption. Once the actual amount of consumption needed is determined for current operation, that information can be fed back to the monitoring service in order to make more accurate determinations as to how much to terminate for future decisions. Further, the types of resources actually required for each stage can be determined as well. The termination can involve functions such as deleting data, unloading of Java classes, termination of background services, releasing of connections or sockets, and other such tasks, and a determination can be made as to which of these tasks is needed for each action to ensure that the action can be performed when making the termination decision. A determination can also be made as to how much is gained from the termination, in order to better balance accessibility with resource gains for selected actions. For example, an application might be selected for termination over a less likely accessed application if the selected application will consume more resources and/or will result in less stable state if not terminated. In some embodiments at least some of these tasks can be performed separate from the application, without the application having any awareness of the action(s). For example, content or classes can be unloaded to conserve resources, and then if the application needs that content the application will need to cause the content or classes to be reloaded. Any such reloading can be fed back to the monitoring service in order to improve future termination decisions.

In some embodiments, at least some of the hints, system events, termination results, and other such data can be sent to a remote location, such as a service operating in a resource environment, or "the cloud," in order to aggregate information. The information can be aggregated across various users in order to determine default application rankings for new users. The information also can be aggregated for different devices for a single user, in order to enable the user's preferences or behavior to be used to make better decisions on different devices. The information can also be aggregated for different users on a single device, similar types of users (based on age, gender, interests), etc. This information can be fed back to the monitoring service, which in at least some embodiments can be a service operating as part of the operating system that can log functions, store received information, and periodically synchronize information with remote resources and other such entities.

The monitoring service 206 can also utilize policies and/or feedback from a policy module 220 or other such component or service. For example, a provider might implement a policy that a minimum amount of memory is needed to retain buffered video content no matter what, or that certain actions are not to be taken on certain types of devices. The policies can be utilized as part of the predictor process, or can be used to determine which of the actions to select, based on those that do not violate any policies. The same (or a separate) component or service can also provide information relating to feedback from the user, device, or another service, among other such options. For example, the effects of certain termination actions and acceptability of the actions might be monitored and provided back to the termination service in order to assist with predictions and/or action selections. If the observed performance gain for a termination action is less than a certain amount, which may depend upon the state of the device, then a weighting of that action or selection might be impacted accordingly. This information can help with the prediction and/or action selection process, or can trump or override the selection actions, among other such options.

Figure 3:
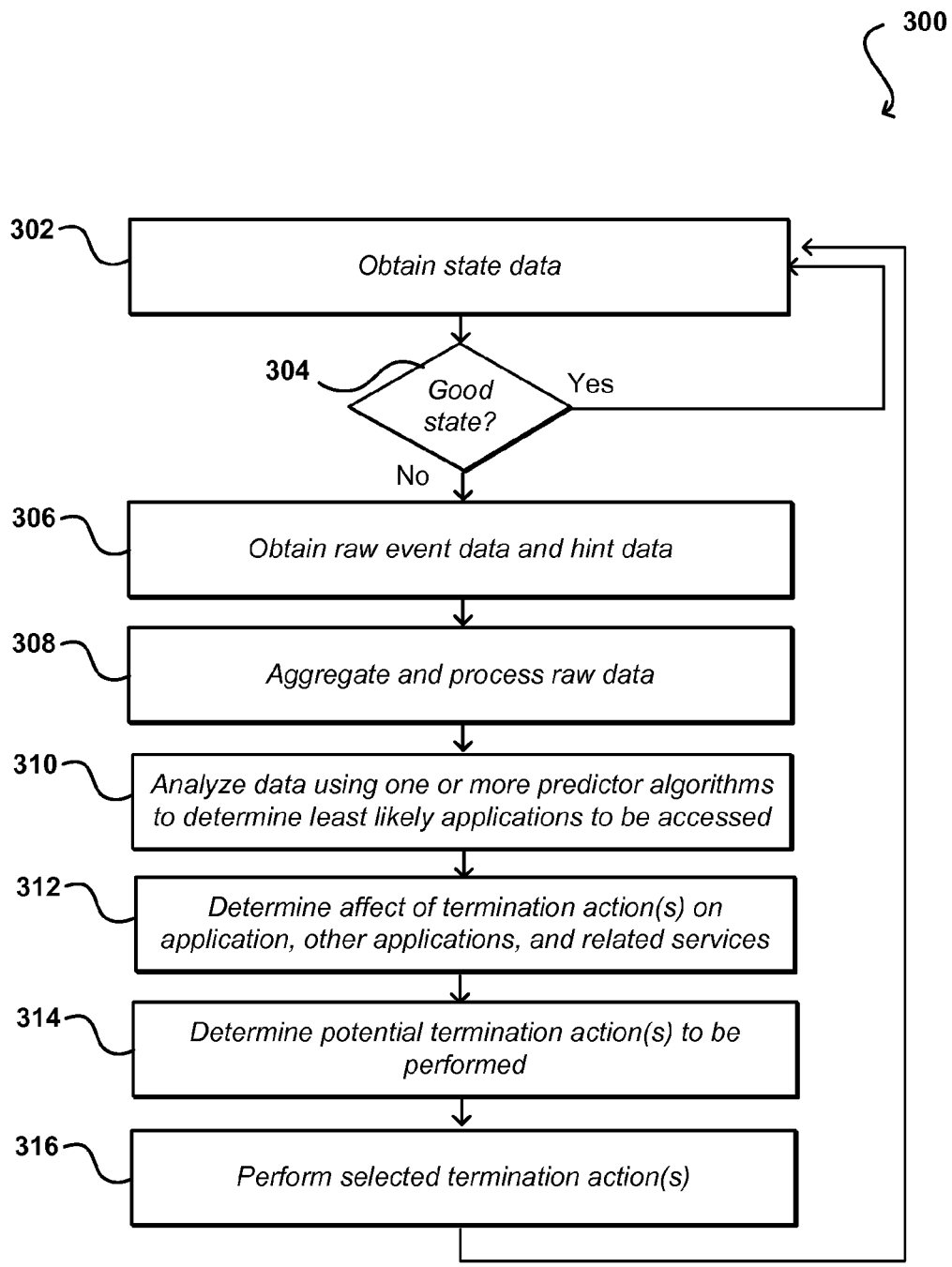
FIG. 3 illustrates an example process for determining applications and services for termination (or other modification) based upon various events and/or hints, and determine various actions to take, that can be utilized in accordance with various embodiments.

FIG. 3 illustrates an example process 300 for determining potential termination actions to be taken on a computing device that can be utilized in accordance with various embodiments. It should be understood that for this and other processes discussed and suggested herein there can be additional, fewer, or alternative steps, performed in similar or different orders, or in parallel, within the scope of the various embodiments. In this example, state data is obtained 302, whether from a plurality of device sensors or from a management module that can receive data from various device sensors and other such sources. These can include, for example, heat sensors, connection managers, memory managers, CPU managers, application managers, and the like. A determination can be made 304 as to whether the device is in a "good" state, or whether the current values for various device parameters are within acceptable ranges. If so, the device can continue to operate under current conditions, with applications and services being executed as needed. If, however, a determination is made that one or more of the parameter values is outside (or approaching being outside) an acceptable range, an attempt can be made to determine one or more remedial actions to be taken on the device.

In this example, raw event data and hint data are received 306 from one or more sources that are local and/or external to the computing device. As mentioned, in some embodiments the raw system event data can come from the operating system (e.g., an activity manager of the OS, where an activity is a sub-portion of the application lifecycle) and the hints can come from various applications or components, such as may be related to the home screen and various other navigational elements of the computing device. The event data and hint data can be processed and/or aggregated 308 in order to be in a form to pass to the predictor algorithm, eliminating spurious or duplicative data, etc. The aggregated data can be analyzed 310 using one or more predictor algorithms, or other such processes. The predictor algorithms in this example can determine the most likely applications to be accessed, or can provide a confidence or likelihood score for access of each of a set of applications, among other such options.

In this example, a determination can be made 312 as to the impact a termination event for an application might have on the application, other applications, and related services, among other such aspects. For example, a background service for an application that is unlikely to be accessed in a near period of time might be a possibility for termination, but if other applications might utilize that background service in the near future then it might be determined not to terminate that background service at the present time. Other determinations can be made as well, such as which of the applications or services are affecting the health of the device. For example, if the device is overheating due to a heavy processing load then it might be more advantageous to cancel an application that is using a lot of processing capacity than one or more background services that are using almost none of the processor's capacity. Similarly, if memory space is an issue then it might not be beneficial to terminate an application that is utilizing almost none of the memory on the device. There can be any appropriate number of applications compared and/or analyzed, depending at least in part upon the system state and the number of applications capable of being terminated on the device. For any potential termination, a determination can also be made as to whether the potential action can be performed. As mentioned, there can be various policies and/or feedback that can be utilized to determine whether or not certain applications, services, or actions can be selected for termination actions, for certain or all states. For example, a policy might indicate that a specific application should not have any termination actions taken for a certain type of device or user, and feedback might indicate that the termination of an application provides insufficient savings to warrant termination. The policies and/or feedback data can be generated local to, or remote from, the device. Based at least on the results of some or all of these determinations, a set of potential termination actions can be determined 314. In some embodiments, this set of potential actions can include up to, less than, or greater than the amount of actions that can actually be taken on the computing device. Once a determination is made as to which actions can or should be performed for the current state, at least a subset of selected termination actions can be performed 316 on the device. In some embodiments all selected termination actions can be performed together, while in others the actions can be performed in sequence until the device is back to operating in a good state, whereby further termination actions may not be performed until the device falls out of that state again, whereby a new set of termination actions may be selected.

In some embodiments certain qualifications or criteria must be met or satisfied before performing a termination action on a device. For example, in some embodiments a minimum likelihood, probability, or confidence level must be met or exceeded before a termination action is taken. The minimum value can change with state, for example, as a device with few currently available resources might require a lower confidence value for a termination than a device with more available resources. Similarly, certain actions might have an associated "maximum available resources" criterion that must be satisfied before the action is taken for termination. Various other such criteria can be utilized as well within the scope of the various embodiments. As mentioned elsewhere herein, the criteria for performing the same action, or the actions available for a given application, may differ for different devices or different users, etc.

In at least some embodiments, the termination is an operating system construct, but can be activated or de-activated by a user or other such entity. A primitive can be introduced that can enable the system to adjust the operation of an application instead of fully terminating the application. Much of the functionality can be contained on the device itself, while functions such as data analysis and aggregation across devices can be performed remotely, such as by a remote service or cloud server. In some embodiments, an application can provide hints to the termination actions that can be taken if the application is aware of such functionality. For example, the application can provide hints as to the optimal termination actions, can provide recommendations based on state, etc.

Figure 4:
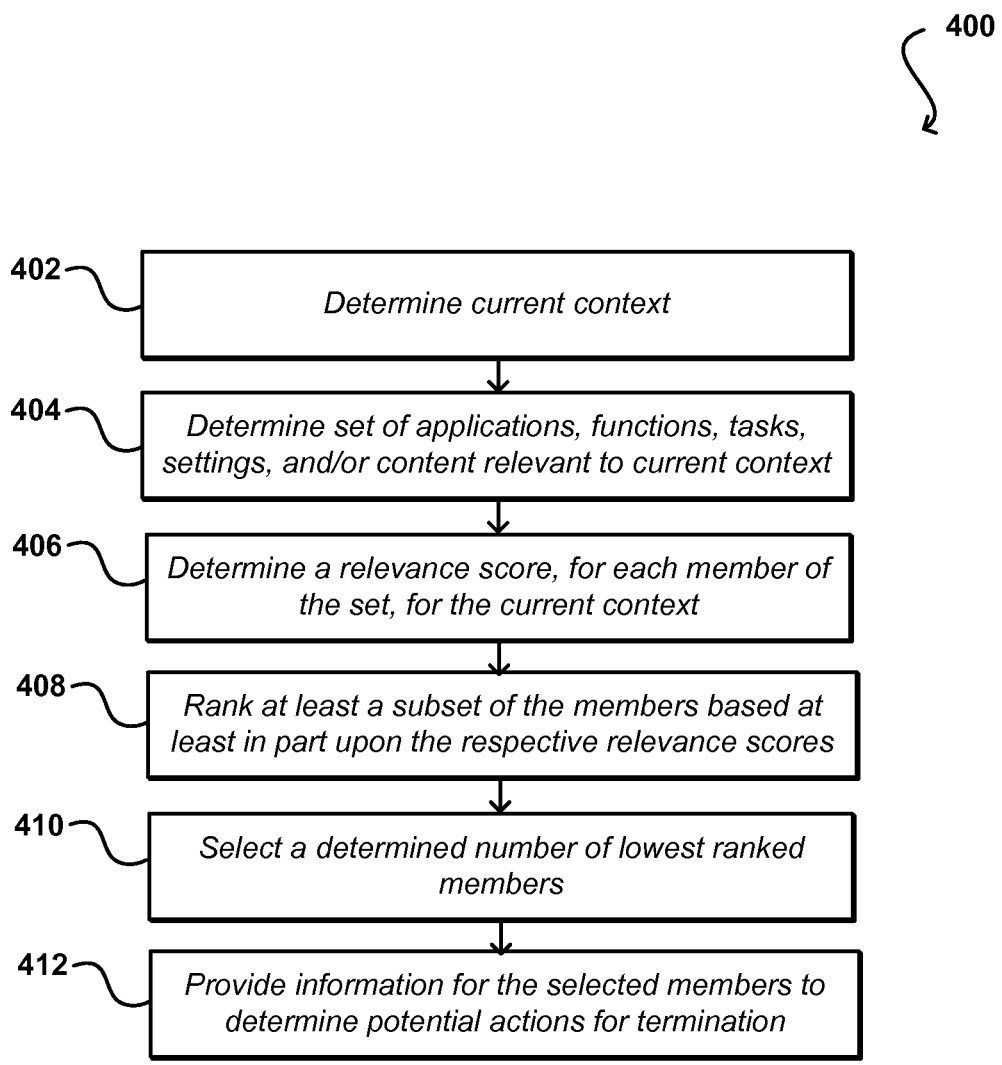
FIG. 4 illustrates an example process for determining which applications and services are the best candidates for termination that can be utilized in accordance with various embodiments.

FIG. 4 illustrates an example process 400 for determining potential applications and/or actions for termination that can be utilized in accordance with various embodiments. In this example, the current context is determined 402 using processes discussed herein that analyze available contextual and other such data. As determined, context can include information such as hints and system events that provide indication as to what the user is doing with respect to the device, a location of the device, processes being performed on the device, and other such information. Based at least in part upon the current context, a set of applications, functions, tasks, settings, and/or content is determined 404 that is at least somewhat relevant to that context. In at least some embodiments, each member of this set can be tagged or otherwise associated with at least one particular context, or can otherwise be dynamically determined. A relevance score can be determined 406 for each member (application, function, task, setting, content, etc.) of the determined set. The relevance score can be determined in at least some embodiments by analyzing the available information discussed elsewhere herein, such as may include location, pattern, usage, user, orientation, motion, preference, history, or other such information. For example, a user at home with a device in landscape orientation may be much more likely to launch a movie player application than a work email application or a navigation application. Once the relevance scores are determined, at least a subset of the members of the set can be ranked 408 based at least in part upon these scores. In some embodiments, only members with at least a minimum relevance score will be considered for recommendation. It should be understood that similar measures, such as confidence scores and the like, can be used as well in other embodiments.

A determined number of the lowest (or highest, depending on type of ranking) ranked members then can be selected 410 to potentially have one or more termination actions performed. In some embodiments this number may be fixed, while in others it might vary based upon the relevance scores of the applications, amount of resources on the device, or other such information. Information for the selected members can be provided 412 to an actions termination or other such component to determine, based on state data and/or other such information, which applications should have termination actions performed and which of those actions should be performed for the current state.

Figure 5:
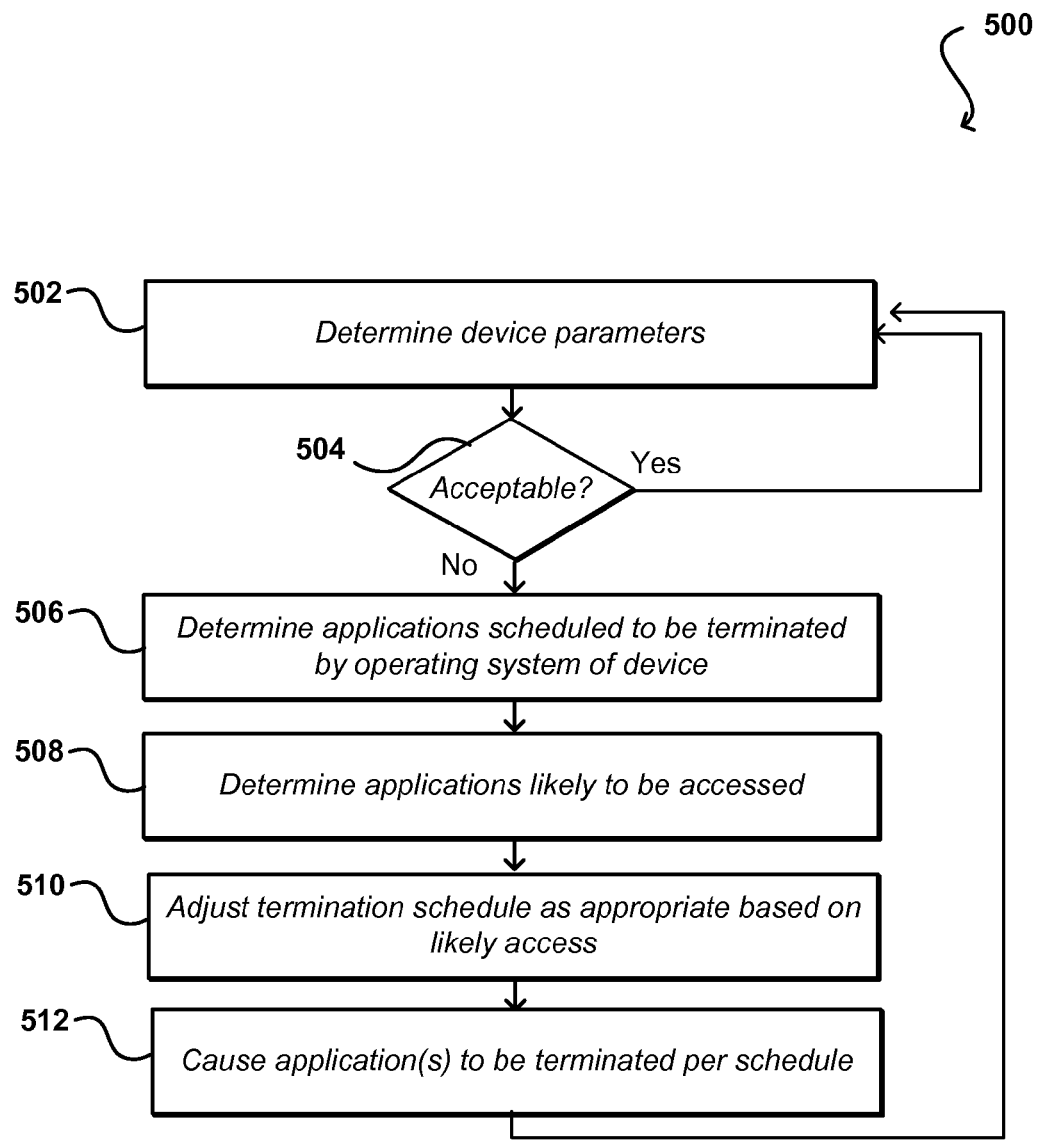
FIG. 5 illustrates an example process for adjusting an operating system termination schedule that can be utilized in accordance with various embodiments.

As mentioned, certain devices have operating systems that can attempt to terminate applications based on fixed parameters such as time of last access. The termination actions can be performed for certain triggers, such as the device running out of available memory. Approaches in accordance with various embodiments can attempt to adjust the schedule, ranking, or selection of applications to be terminated based upon other factors and considerations as discussed herein. For example, FIG. 5 illustrates an example process 500 for adjusting such a termination schedule. In this example, various parameters for a device can be monitored 502 as discussed herein. This can include monitoring aspects such as the temperature of the device, amount of free memory, processor usage, and the like. If the values of these parameters are determined 504 to be acceptable, the device can continue to operate in the current state. If, however, one or more of the parameter values fall outside an allowable range, a determination can be made 506 as to which applications (if any) are scheduled to be terminated by the operating system of the device. Other determinations can be made as well as discussed herein, such as to determine 508 which applications are most likely to be accessed on the device, as well as which are most likely to improve the unacceptable device parameter value, etc. The termination schedule from the OS then can be adjusted 510 as appropriate based on the likely access and other such determinations. At least some of the applications then can be caused 512 to be terminated per the updated termination schedule. As discussed, in some embodiments different types of termination actions can be indicated for performance as well.

Figure 6:
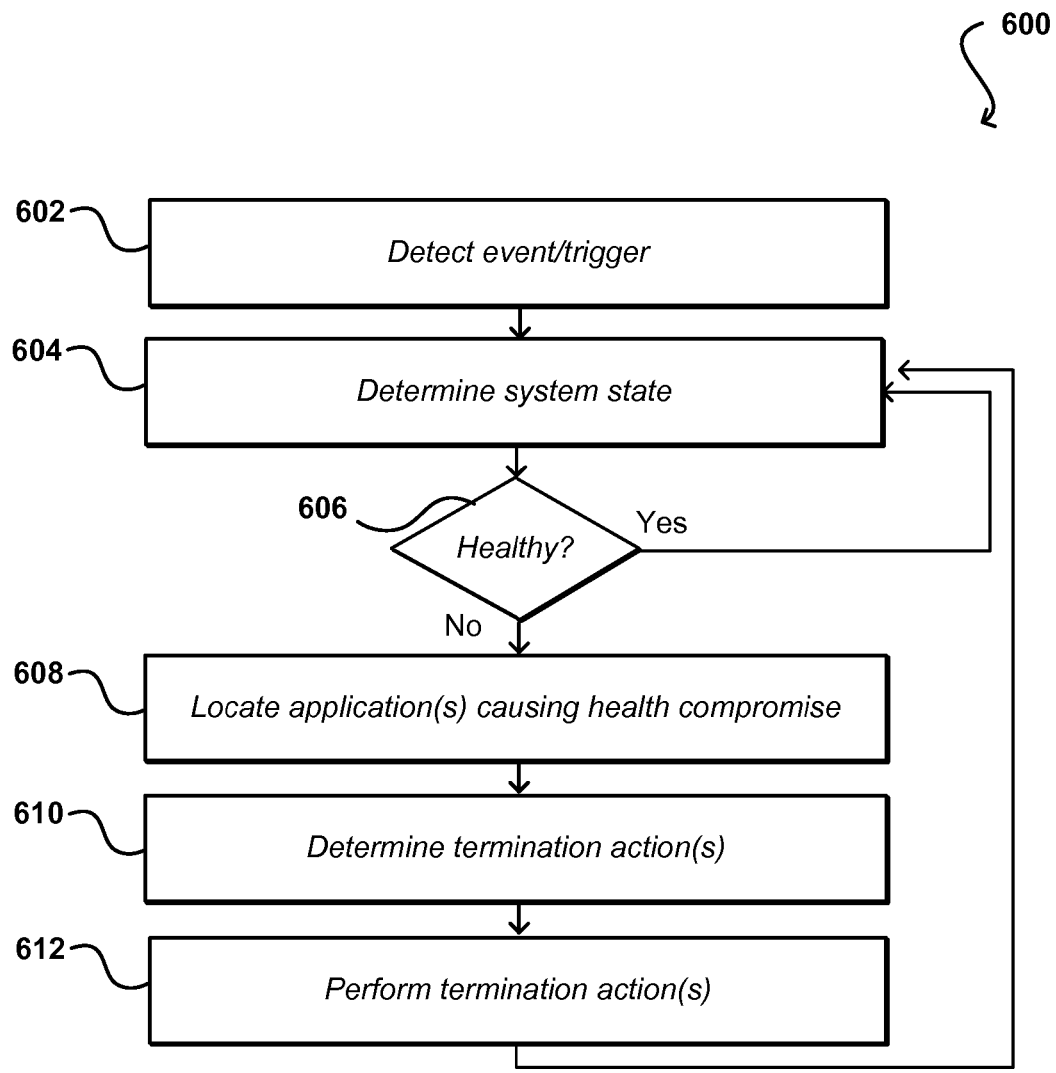
FIG. 6 illustrates an example process for determining an application responsible for a compromise of device health that can be utilized in accordance with various embodiments.

In some situations, a more straightforward approach might be applicable that might reduce the amount of processing needed on the device, which can further assist with improving state of the device. For example, FIG. 6 illustrates an example process 600 wherein an event or trigger can be detected 602, such as the device reaching a certain temperature, a memory state reaching a certain level, or an application experiencing a timeout error, among others. In response, system state data can be determined 604, and if it is determined that the system is healthy 606, or operating within acceptable performance parameters, the device can continue to operate under the same conditions. If the device is determined to be in an unhealthy state, or operating outside one or more acceptable performance parameter values, this process can first attempt to locate 608 one or more applications that are causing the health compromise. For example, if an application is occupying a significant amount of processing capacity but not producing any results, such that it appears to potentially be stuck in a loop or non-ending process, then a determination might be made to terminate that application without having to determine other aspects and updating rankings as discussed herein. In at least some embodiments an application determined to cause the problem might first be analyzed to determine the impact on the user and/or system, and if the impact is determined to be acceptable then that application can be selected for a termination action to attempt to remedy the device health situation before attempting to terminate other applications or services. Accordingly, one or more termination actions can be determined 610 for those applications to attempt to remedy the device health, and at least some of those termination actions performed 612 on the device. If the device returns to a healthy state of operation, then no further remedial action may be taken. If, however, the health is still compromised, additional actions might be taken as discussed elsewhere herein, such as described with respect to FIG. 3, for example.

It should be understood that the information about system state, as well as hints about usage and user behavior, can be used to startup or pre-warm applications as well. If a background service or orphaned process is terminated, but that service or process relates to an application that may be used in the near future, the application or process might be restarted if the device returns to a healthy state where the service or process is unlikely to compromise the health of the device in at least the current state. Thus, the management can not only perform termination actions, but launching or pre-warming actions based on the state, hint, and other such information discussed herein. Further, as the monitoring learns application bindings and the impact of certain terminations, applications and services can be restarted or brought back to a full operating state as appropriate.

As mentioned, application usage predictions can be determined using a number of different approaches. In one embodiment, an application history prediction algorithm is based on a modified Finite Response Filter (FIR). The algorithm is broken into two parts: building (training) and using (predicting). In order to build the state, the prediction algorithm can keep a "tail" of the last N applications that were launched or otherwise accessed by the user. When the next application is launched, a counter can be incremented, such as for:

$App_{n-1}, App_{n-2} \rightarrow App_{n-1}, \ldots App_{n-i} \rightarrow App_{n-i-1} \rightarrow \ldots \rightarrow App_{n-1}$.

As an example, the following sequence could be observed:

App A, App B, App C, App A, App C, App A

After App A is launched, information for App A can be stored to the "tail", then App B. A counter can be incremented such that when App A is accessed the tail can be followed to App B. Next, when App C is launched, a counter can be incremented that when on App B, App C was launched and then increment a counter that when App A was accessed went to App B and then launched App C. Next, when App A is launched, a counter can be incremented that, when on App C, App A was launched and a counter incremented that, when App B went to App C, launched App A was launched and a counter incremented that when App A went to App B and then went to App C, App A was launched and so on. At the end of this short pattern would be the following state:

App A={App B=1, App C=1}
App B={App C=1}
App C={App A=2}
App A→App B={App C=1}
App B→App C={App A=1}
App C→App A={App C=1}
App A→App C {App A=1}
App A→App B→App C={App A=1}
App B→App C→App A={App C=1}
App C→App A→App C {App A=1}
App A→App B→App C→App A={App C=1}
App B→App C→App A→App C={App A=1}
App A→App B→App C→App A→App C={App A=1}

Once enough state is built up (which could be a single entry), that information can be used to make predictions. In at least some embodiments, a predictor algorithm can keep track of the last N applications that were accessed by the user. For each series from current to $N^{th}$ last to current, a request can be made for the "hit counts" for each pattern.

Using the above example, a situation can be envisioned where, at the end of the sequence (App A), a request could be made for the following information:

Hit count for
App A={App B=1, App C=1}
App C→App A={App C=1}
App A→App C→App A=Null (Stop, no point continuing with state fetching since we got null)

After obtaining fetch out state, coefficients can be applied to each set of hit counts and then the results summed:

$$\mu 0 \times \{App\ B=1, App\ C=1\} + \mu 1 \times \{App\ C=1\}$$

If $\mu 0$ is 1 and $\mu 1$ is 2, for example, then after summation:
App C=3
App B=1

Figure 7:
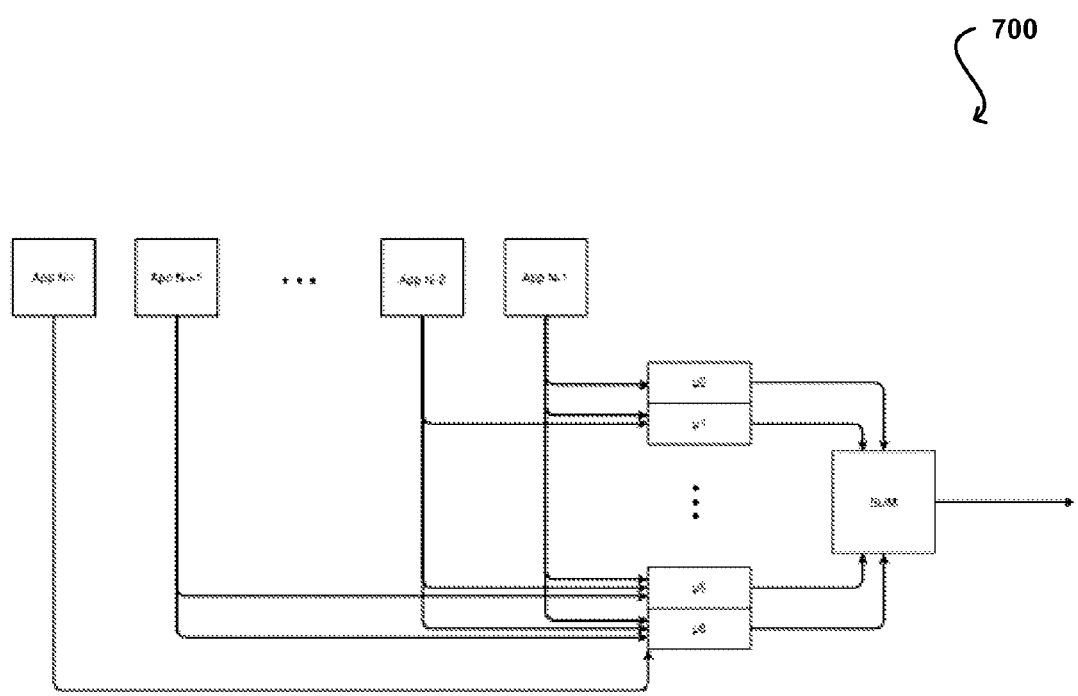
FIG. 7 illustrates an example decision process that can be utilized in accordance with various embodiments.

Based on this it could be predicted that App C is most likely to be launched next on the device. This is illustrated in the example situation 700 of FIG. 7. When supplying the results in some embodiments, the counts can be normalized to give predictions between 0 and 1. In the above case, App C could have a score of 0.75 and App B a score of 0.25 by summing all counts, using that as the denominator for each individual count. However, in some cases it may be sufficient to return that App C is more likely than App B to be accessed, and App B more likely than App A.

As mentioned, in some instances there can be limits on applications or services for which a termination action can be performed. For example, in some embodiments only background services, redundant operations, or orphaned processes may be terminated. In some embodiments any application that is user-facing may be prevented from being terminated. Various other limits or criteria can apply as well. For these applications and services, other actions might be taken, such as logging data about the compromise or otherwise providing a notification such that other actions can be taken to attempt to prevent such compromises in the future. For other embodiments very aggressive termination decisions might be made, such as may include any application with atypical behavior, such as irregular communication patterns, lengthy execution times, excess memory usage, and the like. There can be different policies that apply as well, such as on-device policies that are specific to a user or device, as well as global or cloud-based policies that apply across various users and devices. Metrics can be determined reported to a provider environment or system, for example, in order to update policies as appropriate based on updated data. In some embodiments, a device might start out with global policies and develop local policies as information is learned that is specific to the user or device.

Initially, the back end data stored in a resource provider environment can be used to predict likely to be used applications, as well as applications that are more likely to be used in certain contexts. As used herein, a resource provider environment refers to a set of hardware and/or software grouped physically and/or logically that are provided by a providing entity for use by customers of that provider, as well as users of those customers, for a variety of approved tasks. A resource provider environment can have various forms, such as a multi-tenant environment, cloud environment, enterprise environment, and the like. The data can be aggregated and analyzed anonymously in order to preserve user privacy. The backend data can be used to train and/or bias the prediction algorithms, herein referred to as "static" heuristic algorithms. There can be a set of business rules that are hard coded into the algorithms, and various data and metric aggregated from various users can be used to help seed the dynamic prediction algorithms, which can be locally optimized on a user's device. Initially it might be determined that the browser is the most likely application to be launched for a type of device, but over time that determination can be optimized to the actual usage and behavior of a particular user for a particular device. Thus, a user who primarily uses music applications will have different predictions than a user who primarily is a gamer, etc. As discussed, these determinations can be made in anonymous and in aggregate, as well as for a particular user. The process can start with static determinations and then predictive analysis in the cloud, for example, then move to very tailored and intelligent decision making on the device itself. The process can utilize various statistics, machine learning, and prediction algorithms in order to determine the likely applications to be launched for a given context. Various fitness functions can be used as well, which can help to monitor the accuracy of the predictions and adjust or fine-tune over time.

In order to determine which applications or functionality may be of interest to a user for a particular context, various embodiments enable a computing device to collect information in order to attempt to determine usage patterns attributable to a particular user. In some embodiments, the device can observe and analyze usage data associated with the device, in order to learn to recognize patterns in how the device is used (e.g., how the device operates). The usage data can include current usage data and/or previous (i.e., historical) usage data. In some cases, the user can develop one or more habits or routines in life, such as an hourly routine, a daily routine, a weekly routine, a monthly routine, an annual routine, etc. In one example, the user checks email using the device at approximately 8:07 AM almost every weekday. In another example, nearly every weekday morning for the past month at approximately 8:22 AM, the user gets into his car and opens the map/navigation application to help the user determine the quickest route to work. Based on the user's habits, routines, times that applications were launched or exited, and/or other usage data associated with the computing device, the device (or a system or service in communication with the device) can learn to recognize patterns and/or recurring events related to how it is used or operated (i.e., usage patterns). When attempting pattern recognition, a device (or system or service in communication with the device) can attempt to determine information such as the identity or type of user using the device (e.g., mom, dad, or child), the type of location (e.g., work, school, or home), whether the user is commuting, whether the user is left or right handed, whether the user is male or female, etc. This information can be pushed up the stack and presented to an application via a simple API that provides answers to at least some of those very simple questions.

In some embodiments, having recognized or determined usage patterns associated with how the device is used and/or how it operates, the device can attempt to determine (i.e., identify, predict, etc.) a task(s) that is likely to be performed using the computing device at a specified time. In some cases, the device can calculate a likelihood (e.g., a confidence score indicating) of whether or not the task(s) will be performed using the device within a specified time period (e.g., within the next five minutes, within the next day, within the next decade, etc.). The potential task(s) that is determined can be a task that has a likelihood, above a specified threshold, of being performed at the device within the specified time period (e.g., in the near-future).

Referring to the previous examples, the device can determine, with sufficient, minimum, or satisfactory confidence, that the user is likely to check email today (e.g., a weekday) at approximately 8:07 AM. Further, the device can determine that the user will likely open the map/navigation application at approximately 8:22 AM to figure out the quickest way to get to his work. Based on determining (i.e., identifying, predicting, etc.) which tasks are likely to be performed at the device at or near the specified time, the device can provide recommendations for pre-warming and/or termination.

Continuing with the previous examples, at 8:00 AM, the device can make the email application the most likely to open application for pre-. Moreover, the device can begin to check for and/or download new emails. As such, the user can more easily access email and can finish the email checking task more quickly and efficiently. Then at 8:15 AM, for example, the device can select the navigation application appropriately such that the user can quickly determine to take Highway 101 North to get to work, rather than Highway 909 North. In some embodiments, the providing of the recommendations can be performed dynamically and/or in real-time, such that a change in the situation can be handled quickly.

In at least some embodiments, a computing device can track, record, observe, and/or otherwise obtain usage data associated with the device. For example, a device can recognize a weekday morning routine for a user of the device. The user may, on most weekdays, tend to call a spouse at approximately 9:00 AM while driving to work. In the past two months, at approximately 9:10 AM, the user tends to call the user's boss to report in. At approximately 9:20 AM, for the past three weeks, the user has called Jane's Coffee shop to order and pick up coffee. When the user arrives at work, for the past week, he tends to send a text message to a co-worker, Johnny. Then, for the last three days, the user has been dialing in to a conference bridge number to attend a teleconference meeting at 10:00 AM. These actions initiated and/or performed by the user using the device can be observed or otherwise tracked as usage data of the device. Thus, the device can not only learn the patterns of the user with respect to various applications, but also patterns of usage with respect to that application. Thus, when the user selects the phone application, the phone app might be configured to be ready to dial the number that the user is most likely to dial based on the current context, such as day of the week and location, etc. Further, based on the obtained usage data, the device can identify a usage pattern which indicates that the user is likely to call the user's spouse today at approximate 9:00 AM. As such, the device can select a contacts application that may be set to show information for the user's spouse at the top of a recommended contacts list, at or prior to 9:00 AM. Also, in some embodiments the device can retrieve information from the web (e.g., a local business and restaurant guide website), and provide the retrieved information to the user. For example, an address for a number to be dialed can be promoted through an address or navigation application. In a similar fashion, since the user tends to text message Johnny, the device can recommend a messaging application, and can configure Johnny's phone number and email address (e.g., retrieved from the device's contacts feature or app) to be available in case the user wants to call or email Johnny instead. Moreover, based on the obtained usage data (e.g., including data from a calendar/events feature or app of the device), the device can recognize that the user will likely attend a teleconference at 10:00 AM and recommend a calendaring application or phone application, using the relevant conference and bridge information.

In at least some embodiments, relevant information can be determined based at least in part upon usage data. A user of a computing device can host a weekly "movie night" in which the user invites friends over to hang out, eat, and watch a movie. Accordingly, the example scenario can involve, among other things, the user, one or more friends of the user, food (e.g., delivered pizza, take-out food, etc.), a device for watching the movie (e.g., a television), and movie content, among other such things. The user may have hosted the movie night on nearly every Friday night for the past year. In this example, the device can obtain device usage data including (but not limited to) how the device is used to make communications (e.g., phone calls, text messages, emails, etc.) among the user and the various friends, how the device is used to order food, and how accessing a web service to obtain movie-related information is performed using the device. Based at least in part on this data, various usage patterns can be determined. For example, it can be recognized that, on a typical Friday night, the user calls John, Dave, and Jane at approximately 7:00 PM, orders food from "Pizza Place" at approximately 7:30 PM, and accesses web information about movies at approximately 8:00 PM. Accordingly, applications can be recommended or prioritized at or near each of these times that enables the user to easily perform these actions. Further, the state or options presented to the user for those applications may also be determined based at least in part upon this data.

In some embodiments, based on the identified/recognized usage patterns one or more tasks can be determined that have at least a sufficient, minimum, or satisfactory likelihood of being performed at the device (e.g., initiated by the user). Thus, the device can provide access to relevant applications, information, and/or functionality, including suggestions or recommendations, at or prior to a time when the information may be useful. The device can provide access to the phone application and/or to contact information for John, Dave, and Jane, at or prior to 7:00 PM (when the user typically contacts John, Dave, and Jane). Likewise, at or prior to 7:30 PM, the device can provide quick access to a reservation or ordering application and provide access to information about a restaurant that the user typically orders from. In addition, at or prior to 8:00 PM, the device can provide quick access to a movie application to provide easy access to movie information, or can alternatively prime a browser window to launch a website that the user frequents to order movies or other media. This and other relevant information provided can improve the efficiency and/or ease of access associated with performing the user's tasks.

At least some embodiments provide and/or utilize and intelligent recommendation engine to determine applications, tasks, settings, functionality, or other aspects that can be provided and/or recommended for pre-warming and/or termination. Going beyond monitoring past usage, as discussed above, an intelligent recommendation engine can analyze any relevant and/or appropriate information to determine which applications, for example, to terminate. This can include information available to the user device, a backend system, a third party service, and the like, and can come from any appropriate source. This information can include, for example, purchase or viewing history information relating to products viewed, purchased, rented, or otherwise accessed from one or more sites or sources, whether accessed via the current device or otherwise. Information can also include information from message or email mining, for example, such as where a recently received email message including a boarding pass and boarding information can cause an airline or airport application to be surfaced. Information from a calendar or task list can be used to surface documents relevant to a meeting, an application relevant to performing the task, and so on. The user can use available network or location information to determine that the user is in a movie theater complex and surface an option to adjust the volume or enter airplane mode, among other such options. A combination of connection, location, calendar, and mining information, for example, can be used to determine that the user is at the airport waiting on a plane, and can recommend an application to play recently downloaded movies, or can preload one or more of those movies to enable the user to play one of them directly. Alternatively, the recommendation engine can recommend a media library, which the user can open to select a downloaded moving to play. Various other types of information and recommendations can be utilized and/or provided as well in other embodiments. The applications selected might correspond to applications or elements of which the user might not be aware but might be interested in utilizing based on the current context, etc.

An intelligent recommendation service can also utilize information that may not be specific to the user but might be relevant to the user. For example, if there is an accident on a route the user is taking (or about to take) the engine can recommend a navigation or traffic application to enable the user to select another route. If the user is about to leave for an event but there is bad weather forecast, the engine might recommend a weather application. If there is late breaking news that is likely to be relevant to the user, the engine might recommend a news application or even an icon for a specific article. If a user's car needs servicing, as may be determined by communicating with the vehicle, the engine might recommend a dealer service application, etc. Each of these approaches would be treated like other relevant applications in at least some embodiments, with each suggestion being ranked, scored, or otherwise analyzed to determine a number of icons or graphics to surface to the user, such as icons for the five to ten most highly ranked or scored applications. Different types or levels of information can be weighted differently, as may be predetermined or determined in response to user preferences or activity. For example, the user might often check the weather but may not care about the traffic, such as where the user uses a bike for transportation, etc.

In some embodiments, the orientation of the device and/or the way in which the user is holding the device can be used to determine which applications to select for pre-warming and/or termination. For example, a user might always watch movies in landscape mode, with the longer dimension of the display screen being predominantly horizontal, but might always text with the screen in portrait mode, with the longer dimension being predominantly vertical. The display mode of the device can be used as well, such as where the device is flat on a table but the user has put the device in a certain orientation, which can be determined through user head tracking, finger touch shape processing, and the like. If the device is determined to be in landscape mode, certain applications such as movie players and gaming applications might be ranked higher than applications such as clock or messaging applications if the user typically uses the clock and messaging applications in portrait mode. Other information can be used as well, such as whether the device is in motion (such as in a vehicle), being held by a user (as may be determined through small variations in position or orientation), connected to a wireless data network, and the like. Any appropriate information that can help to determine the most likely applications to be accessed can be utilized in accordance with various embodiments.

As mentioned, the dynamically-determined relevant information that is provided to the user can change dynamically and/or in real-time. For example, if the device detects (e.g., using information retrieved from a web resource, such as a local restaurant review website) that Pizza Place is closed for some reason, then the device can delete content for that location and preload or pre-warm applications, pages, or data for other similar restaurants and/or other restaurants from which the user has previously ordered. In another example, if an electronic message is received from Jane at 6:40 PM indicating that she cannot attend the movie night, then Jane's contact information need not be provided and/or the phone application need not be prioritized to assist the user in contacting Jane. In a further example, if it is determined that the user tends to post a status update on a social networking application an hour into the movie, the device can prioritize the application to assist the user in obtaining easier access to social network at or prior to that time. In another example, if the device determines, based on device geolocation (e.g., GPS) data, that it is not at, or near, the user's home address on a Friday night, then the device can decide not to provide this information or prioritize these applications, even though based on other data such as time of day and day of the week they might seem relevant. The device can determine other relevant information to provide instead based on the available contextual data.

Moreover, various embodiments can enable communications among multiple devices. In one example, the user may have been using a first device throughout the day to browse the web, and may have spent a lot of time viewing information about "Movie XYZ." Additionally or alternatively, the user could have used that device to communicate electronically with friends throughout the day and they could have agreed to watch Movie XYZ. These and other pieces of usage data can be observed, obtained, and analyzed by the first device (or systems or software in communication with the first device). The first device can determine that data related to Movie XYZ is likely relevant for tonight. In some cases, a second device can perform one or more actions using the relevant information (e.g., the data related to Movie XYZ). For example, the second device can communicate to the first device to cause the first device to prioritize a media player application and begin loading the contents of Movie XYZ prior to when the user typically watches movies (e.g., preload at least a portion of Movie XYZ prior to 8:00 PM). This can reduce lag and/or buffering time associated with playback of the movie (and/or other media content). Also, the preloading can increase a quality (e.g., image quality, resolution, bit rate, audio quality, etc.) associated with playback of the movie. Furthermore, in some embodiments, the movie (and/or other media content) can be preloaded on the second device.

In some embodiments, whether the user actually accessed and/or used the provided relevant information can be taken into consideration. For example, if the user no longer used the provided contact information for Jane for the last three movie nights, the device can learn from this pattern and can utilize it as input or feedback, such that perhaps next time, the device need not provide Jane's contact information or prioritize the relevant application(s).

In another example where relevant information can be determined dynamically based on contextual data, an example device can utilize one or more geolocation sensors on the device to obtain geolocation information associated with the device. An example device can include various sensors for determining things such as geolocation, altitude, speed, motion, and the like, as may include one or more or a GPS sensor, a sensor for radio signal multi-lateration, an electronic gyroscope, an inertial sensor, an electronic compass, an altimeter, a barometer, and the like. A device might also analyze audio and/or video data in the environment around the device to determine data such as location, type of location, nearby people, and the like.

In one example, the user of a computing device frequently meets with his best friend Dave at Joe's Grille on Saturday evenings. The user can be utilizing a map application (i.e., app) to get to Joe's Grille. The mapping and/or navigation app(s) can indicate that the user's current representative geolocation has arrived at the desired destination (e.g., Joe's Grille). The device can recognize that the user frequently meets Dave at Joe's Grille on Saturday evenings (at or near 5:00 PM). As such, at or prior to Saturday 5:00 PM and/or upon recognizing that the user (e.g., the user's device) is at or near Joe's Grille, the device can prioritize the appropriate application. A notification can ask the user whether he would like to contact Dave, and if so can prioritize the icons for the relevant application(s). The user can interact with (e.g., click on, tap on, etc.) the notification and/or icon to cause a communication application (e.g., messaging application) to be provided to the user. The type or selection of application can be based at least in part upon the applications that the user historically uses for such purposes in such contexts.

In some embodiments, a device can analyze usage data including communication data (e.g., data associated with phone calls, data associated with call logs, data associated electronic messages such as text message or emails, etc.). In one example, most of the time when the user arrives at Joe's Grille to meet Dave, the user will send a text message to Dave stating "Hey Dave, I'm at Joe's Grille. I'll meet you inside." The device can recognize that the user frequently and recurrently sends this (or another similar) message when the user arrives. Thus, the communication application can be prioritized at the appropriate time, and when the communication application is provided to the user, the device can generate (e.g., preload) message content that reads "Hey Dave, I'm at Joe's Grille. I'll meet you inside," which the user can then choose to send. In some embodiments, this might be an option that the user can select by swiping in a certain direction from the application icon, as discussed elsewhere herein. This can further reduce the time and effort required by the user if he was to type the message manually.

In some embodiments, if a device detects that the time is Saturday 5:15 PM, that the user has not yet arrived at Joe's Grille, and that the user is not on the way, then a notification can be provided to the user asking him whether he would like to contact Dave, and the appropriate application can be prioritized. If the user chooses to contact Dave, the message content can be generated by the device to state, for example, that the user cannot make it, or something similar. Alternatively, if the device detects that the user is still on the way, then the message content can be generated to say that the user is running late but still on the way, or something similar. Again, the application can be prioritized and the option to send the message can be provided as a default option that is dynamically determined for the current context.

In addition, in some cases the device of the user can communicate with a computing device associated with Dave. If at least one of the devices determine that its respective geolocation is substantially close in proximity to that of the other (but not close to Joe's Grille), then the device can recommend another restaurant that is nearby, and can potentially prioritize the icon for a reservation and/or restaurant review application, among other such options.

In one process for providing relevant information based at least in part on usage data, historical usage data associated with a user of the computing system is obtained. Along with, or as part of, the historical usage data can be information such as location, time of day, day of week, and the like. The historical usage data can be analyzed and, based at least in part on the analysis of the historical usage data, one or more usage patterns associated with performing actions on the computing system can be recognized. The actions can be initiated by the user. The process can involve determining a computing task having a sufficient likelihood and/or confidence value (e.g., at least meeting or satisfying a threshold or criterion) of being initiated by the user to be performed at the computing system. In some cases, the computing task can be determined to have a sufficient likelihood of being initiated by the user to be performed at the computing system within a specified or determined time period. In some cases, the computing task can be determined based, at least in part, on the one or more usage patterns. Then the process can provide at least one recommendation associated with performing the computing task. In some instances, the at least one recommendation can be provided within the specified time period. The at least one recommendation can be useful for improving efficiency associated with performing the computing task. For example, the at least one recommendation can decrease an amount of user interactions required to perform the computing task. In other words, due to the at least one recommendation, less effort on the part of the user is need to perform the computing task.

In another example process, usage data associated with a user and/or computing device can again be obtained, with the usage data analyzed to determine one or more usage patterns associated with the computing device. Information can be determined that has at least a minimum likelihood of being relevant to a user of the computing device. In some instances, the information can be determined to be likely relevant to the user within a specified or determined period of time. In some cases, the information can be determined based, at least in part, on the one or more usage patterns. Access to the information that has the at least the minimum likelihood of being relevant to the user can then be provided, such as by prioritizing application launch icons that enable the user to access specified data and/or functionality. In some embodiments, access to the information can be provided within the specified period of time. In some instances, the information can be useful for improving an efficiency associated with performing a task of the user. The task can be performed using, at least in part, the computing device. In some cases, the task can be performed within the specified period of time.

In some embodiments, obtaining usage data can include accessing information indicative of how the user uses the computing device. For example, the information can include (but is not limited to) at least one of communication data, calendar data, clock data, geolocation data, orientation data, image data, mining data, environmental data, event data, seasonal data, occurrence data, user historical data, user preference data, user purchase history, audio data, web browsing data, network data, or application data. In some embodiments, access to the relevant information can be provided via at least one of a page interface (e.g., home screen page interface), a desktop interface, an operating system interface, a notification, a reminder, a calendar event, or an application interface, etc. Various embodiments can also enable third party application developers to utilize the present technology. For example, application programming interfaces (APIs) for the present technology can be implemented such that third party applications can utilize one or more features of the present technology. In some cases, the user of the device can choose whether or not to allow an app (e.g., third party app) to have access to the present technology. It is further contemplated that there can be many other uses and/or applications associated with the various embodiments of the present disclosure that a person having ordinary skill in the art would recognize.

Applications selected for pre-warming or termination in some embodiments can be based on usage patterns such as those determined from the examples given above. For example, when a user is to get together for movie night with friends, the selection might first include a messaging application, as the user tends to contact the friends at a certain time. A lower priority, or the highest priority after the contact, might be a restaurant application, as the user might order food after contacting the friends to find out what they want. The next highest priority, or highest priority after the food order, might be the movie application, as the user typically looks for movies that the user wants to watch that night. While the user might do some of these events out of order on certain nights, or might not contact certain friends certain nights, for example, the applications can be selected at the appropriate time for pre-warming or termination. As discussed, the selection can differ by time, actions, or location, for example, and the priorities can change over time as user behavior changes, such as by inviting different friends or using different applications to rent movies, among others. It should be understood, however, that different approaches to causing a contextual interface overlay to be displayed can be used as well, and in some embodiments the overlays can be triggered by system level functionality that can be toggled on or off by a user, for example.

Also as mentioned, there can be different selections for multiple different contexts. In one example, there can be three contexts, as may include a work context, a home context, and a weekend context, among others. In this example, a first selection might be determined based at least in part upon current contextual information. For example, the user device might be at a location associated with the user's place of business, and the time might be midday on a weekday. Accordingly, based on historical data the device can assume with relatively high confidence that the user is in a work context, and that applications associated with the work context should take priority. The applications associated with the work context might relate to contacts, email, VPN, teleconferencing, and the like. The ordering or ranking can be determined based at least in part upon the current context. For example, a user might always check email when first arriving in the office, and might always set up teleconferences for after lunch. Accordingly, these applications can be prioritized differently based on the time of day. Further, the user might only teleconference from his or her office but might check email anywhere, such that the applications can be ranked or selected differently based upon location in the business as well.

It might be the case, however, that the user is taking a break or wants to perform non-work related tasks while on a teleconference or in another such situation. Accordingly, the user might want to access applications that are more related to a different context, such as a home context. Similarly, the user might run home during the work day to wait for a service person, for example, and might prefer to be in a home context. If the location of the device is at home, a home context can be determined dynamically, or the user can have the option of indicating a home context. The selection for a home context might include a partially or completely different selection of applications, in a similar or different ordering than for the work context. For example, the email application might still be selected, but a gaming application and a movie viewing application selected instead of VPN or teleconferencing applications. The selection can vary not only by the context, but also the other factors such as location, time of day, day of the week, etc. Other selections may be determined as well, such as a third selection which might include fantasy football applications, grilling applications, or other applications that might be more relevant for a weekend context, for example. As mentioned, the selection and ranking of applications can vary based upon current contextual information, and the user can have the ability to switch between contexts should the user want to operate within a different context. Various other options can be utilized as well within the scope of the various embodiments.

In at least some embodiments, information for a user can be determined by creating a statistical regression profile that can be used to track the applications that a user launches, exits, or switches to, over a multi-week time frame. Over time the profile can be used to determine, for any given time during the day, which applications are most likely to be utilized. This can also be expanded to learn the applications most likely to be used for a given location, sequence of actions, etc. This information can eventually be utilized, such as in response to a minimum confidence threshold being reached, to select a number of applications (e.g., four to ten) to potentially be pre-warmed for a given context. In some embodiments the process can begin with a single context until there is sufficient information to warrant additional contexts, and sufficient confidence to be able to associate the applications by context. In some embodiments the time window being investigated is segmented, from a highest level such as a weekly profile. Such implementation can be beneficial, as usage will generally change between weekdays and the weekend. The profile can also be segmented into 10, 15, or 20 minute segments each day, for example, with weekdays potentially getting smaller segments than weekends due to the relative amount of activity. The amount of time spent using an application can be tracked for each segment or bucket of time. The results can be refined over time in order to update the probabilities, such as by averaging the ratios.

Additional approaches can be used as well, as there may not be sufficient data at certain times to make a prediction with an acceptable level of confidence. For example, in the middle of the night on a week night there might historically be very little activity. Accordingly, overall user usage might be monitored to determine applications that users tend to use at this time of night while at home, such as flashlight applications, emergency services, and the like. Such information can be a combination of contextual inference and statistical refining over time.

Various other patterns can be recognized and/or identified as well. For example, a device might determine applications that a user accesses when commuting, such as riding on a bus or train. At least one device sensor can be used to determine the location and approximate rate of speed to determine applications that the user utilizes during the commute at a time of day and day of week. If the user has a limited data plan and does not stream much data while commuting, the device can prioritize applications accordingly. The user might check email and calendar applications, but not engage in teleconferences, so the applications can be ranked using this information. The pattern recognition algorithms also can look at information such as the peripherals to which the device is connected. If the device is connected to a Bluetooth audio component then there is a good chance the user will utilize a media application. If the device is connected to the user's car, then it can be likely that the user is driving.

In some embodiments, the pattern recognition analysis starts with the weekly analysis then adds in the geolocation and other such data. Global information can be used as well as user-specific information. Information also can include the type of device as well as the type of user. Instead of looking at which application is running every second, the process can look to application starts and stops for a particular time bucket, and can look to the other contextual information available at that time. A duty cycle can be computed over a time window of fifteen minutes, for example, and every day can be segmented into these buckets of 15 minutes. It might be determined that one application was used on average for 5% of a given bucket of time, one for 25%, etc. This can be performed over and over, day after day and week after week, with the results being averaged using a moving average with some type of decay to favor more recent trends. A sliding window of four weeks might be used, which provides enough data for a confidence determination while not causing a game that a user quit playing a month ago to still appear as a recommended icon. The apps suggested for a given context thus can also change over time. The device can determine the appropriate bucket (in terms of time of day), and those duty cycles can be used to rank the applications. Since a single bucket might not provide enough data, the determination may need to utilize data from one or more adjacent time buckets, potentially with an appropriate weighting to favor data in, or closer to, the current bucket. The data then can be averaged out, such that the results are within the statistical regression profile.

And, as discussed, the sequence with which a user performs certain actions can be utilized as well. As an example, when a user arrives at home the user might typically check email to finish work, then quickly open a social media application, then open a media serving application to watch TV shows or movies. This might generally occur around 7-8 pm every night. When the user subsequently arrives at home and utilizes the email application, the user afterwards does not typically want the email application to be shown again when the user exits the email application. Accordingly, because the user has already used the application and is not very likely to use it again right away, the social media application can be recommended followed by the media serving application, with the email application not being recommended for pre-warming at all. Similarly, once the social media application is closed the media serving application may be prioritized. Since people are fairly predictable in their habits, devices should be able to make recommendations for them based on that predictability. Various other information can be used to determine the appropriate context as well, such as battery power, whether the user is walking or biking, etc.

Figure 8:
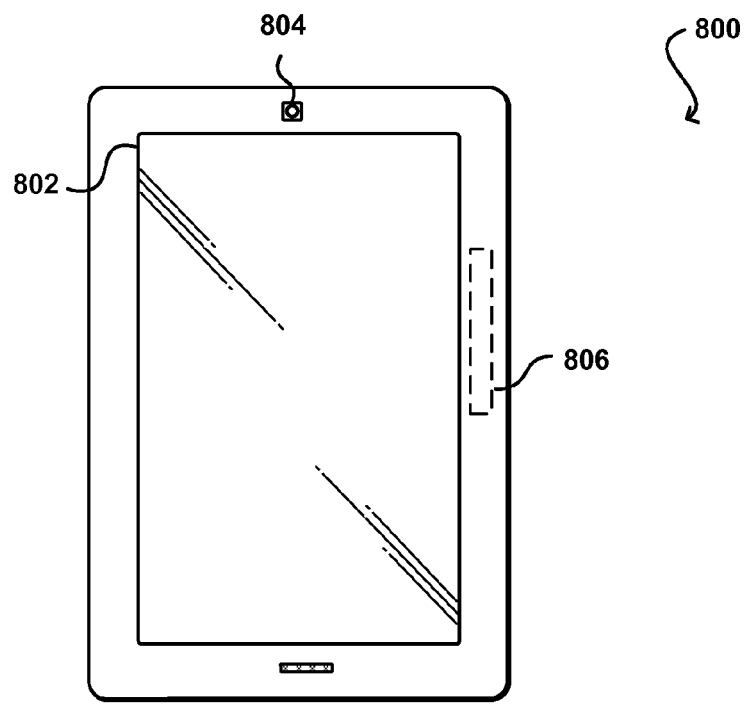
FIG. 8 illustrates an example device that can be used to implement aspects of the various embodiments.

FIG. 8 illustrates an example electronic user device 800 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 800 has a display screen 802 on the front side, which under normal operation will display information to a user facing the display screen (e.g., on the same side of the computing device as the display screen). The computing device in this example includes at least one camera 804 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. Further, each image capture element can comprise a digital still camera, configured to capture subsequent frames in rapid succession, or a video camera able to capture streaming video.

The example computing device 800 also includes at least one communication component 806, which can enable the device to communicate with one or more systems or services over at least one wired or wireless network, such as may include the Internet, a cellular network, a local area network (LAN), and the like. The device can also include at least one microphone or other audio capture device capable of capturing audio data, such as words or commands spoken by a user of the device. In this example, a microphone is placed on the same side of the device as the display screen 802, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 800 can include at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 9:
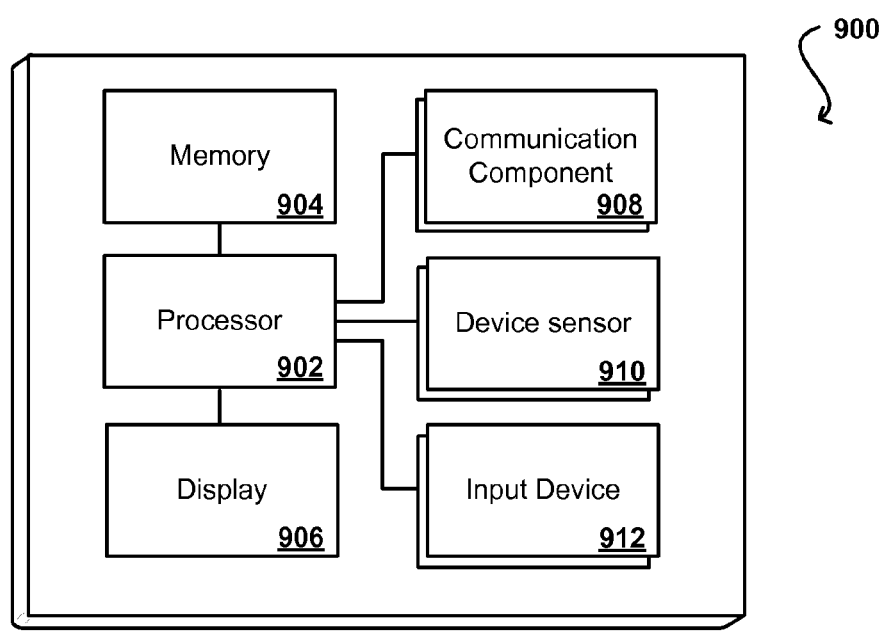
FIG. 9 illustrates example components of an example device such as that illustrated in FIG. 8.

FIG. 9 illustrates a logical arrangement of a set of general components of an example computing device 900 such as the device 800 described with respect to FIG. 8. In this example, the device includes a processor 902 for executing instructions that can be stored in a memory device or element 904. This can include, for example, running the predictor algorithms and determining appropriate termination actions as part of the monitoring service 206 illustrated in FIG. 2. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically may include some type of display element 906, such as a touch screen or liquid crystal display (LCD), although devices such as portable media players might convey information via other means, such as through audio speakers. The device can include various sensors 910 for providing data useful in determining system events 202, hint data 204, and/or state data 216, as illustrated in FIG. 2, which as discussed herein can include sensors such as heat sensors, memory managers, processor managers, and the like.

In some embodiments, the computing device 900 of FIG. 9 can include one or more communication components 908, such as a Wi-Fi, Bluetooth, RF, wired, or wireless communication system. The device in many embodiments can communicate with a network, such as the Internet, and may be able to communicate with other such devices. The communication components 908 can receive, for example, event data and hint data, as well as state data, as part of the monitoring service 206 illustrated in FIG. 2, and can be used to provide a set of termination actions to a termination process or component 218 as well, among other such options. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 900 also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 902, whereby the device can perform any of a number of actions described or suggested herein.

As an example, a computing device such as that described with respect to FIG. 9 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 10:
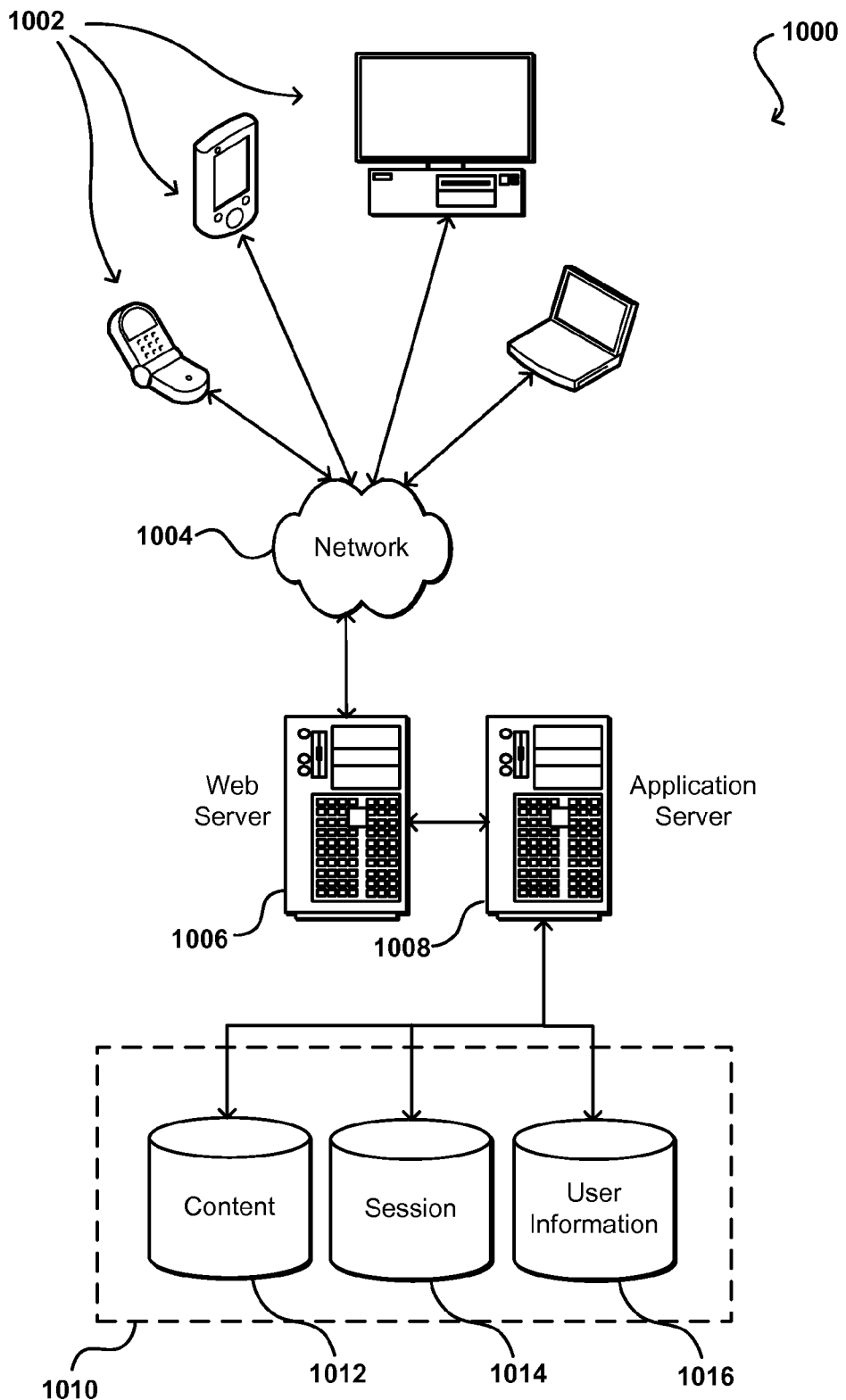
FIG. 10 illustrates an example environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1002. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor; and
   memory including instructions that, when executed by the at least one processor, cause the computing device to:
   determine that a value for an operational parameter of the computing device is outside a specified operational range;

obtain event data and hint data with respect to the computing device, the event data relating at least in part to one or more operational events detected by an operating system of the computing device, the hint data provided by one or more applications executing on the computing device;

analyze the event data and the hint data using one or more predictor algorithms to determine a set of applications having a probability to be executed on the computing device, over a specified period of time, based at least in part upon one or more patterns of user interactions with the computing device, a first application of the set of applications having a first confidence score determined with respect to being executed;

determine one or more termination actions for at least a subset of the set of applications, a first termination action of the one or more termination actions capable of being performed with respect to the first application;

determine state data for the computing device, the state data indicating at least usage of one or more resources of the computing device;

determine, for at least the first termination action, an impact likelihood of the first termination action affecting another application of the set of applications executing on the computing device;

select, based at least in part upon the state data, the impact likelihood, and the first confidence score for the first application, at least the first termination action to be performed on the computing device; and cause at least the first termination action to be performed on the computing device.

2. The computing device of claim 1, wherein the hint data indicates at least one of a location, an active user, a user activity, installed application data, application or content download, related device activity, or a time of day, wherein the one or more predictor algorithms further analyze the hint data to determine at least the first application.

3. The computing device of claim 1, wherein the instructions when executed further cause the computing device to:

determine a ranking of the set of applications by confidence score, a higher confidence score indicating a higher determined likelihood that a respective application of the set of applications will be executed over the specified period of time; and select at least a second termination action based at least in part upon the ordering, the second termination action performed with respect to a second application, the first application having a lowest ranking of the set of applications and the second application having a second lowest ranking of the set of applications.

4. The computing device of claim 1, wherein the instructions when executed further cause the computing device to:

determine a background process associated with execution of the first application;

determine a second impact likelihood of termination of the background process affecting operation of the first application; and cause at least the first termination action to be performed with respect to the background process.

5. A computer-implemented method, comprising:

determining, based at least in part upon event data and application-related data for a computing device, that a first probability that a first application will be accessed on the computing device over a period of time is below a determined value;

determining a first termination action that is capable of being performed with respect to the first application;

determining, based at least in part upon the event data and the application-related data, a second probability that a second application will be accessed on the computing device;

determining a second termination action that is capable of being performed with respect to the second application;

determining to perform the first termination action before the second termination action based at least in part upon a ranking of the first probability and the second probability, the first probability corresponding to a lower ranking than the second probability, a probability of the first termination action impacting a third application executing on the computing device, and a probability of the second termination action impacting the third application; and performing the first termination action on the computing device prior to performing the second termination action.

6. The computer-implemented method of claim 5, further comprising:

determining that a current operational parameter, after performing the first termination action, is outside a specified range; and selecting at least the second termination action with respect to the second application.

7. The computer-implemented method of claim 6, further comprising:

determining to perform the first termination action before the second termination action based at least in part upon at least one of a device-level policy or a global policy for termination actions.

8. The computer-implemented method of claim 5, further comprising:

determining, for the first termination action, to terminate the first application to a determined state, the first application having a plurality of operational states.

9. The computer-implemented method of claim 5, wherein the event data relates to one or more tasks performed by the computing device, the one or more tasks including at least one of launching an application, closing an application, minimizing an application, maximizing an application, activating a screen, causing the computing device to enter a sleep state, or waking the computing device from a sleep state.

10. The computer-implemented method of claim 5, wherein the application-related data corresponds to one or more activities being performed via the computing device, the one or more activities including at least one of acquiring an image, navigating an interface, accessing a home screen, opening a navigation panel, adjusting a volume, installing application data, downloading an application or content, causing related device activity, or moving between locations.

11. The computer-implemented method of claim 5, wherein the first termination action includes at least one of partially terminating the first application, closing a connection or socket for the first application, unloading one or more classes or libraries utilized by the first application, terminating a background process associated with the first application, deleting cached data for the first application, terminating an orphaned process associated with the first application, logging data for the first application, or throttling an operational level of the first application.

12. The computer-implemented method of claim 5, wherein determining the first termination action is further based at least in part upon at least one of an amount of available memory, an amount of available processing capacity, an amount of remaining battery charge, a number of frame drops, a device temperature, a type of available connections, a number of orphaned processes, a number of concurrently executing applications, a respective amount of memory used by each application of a plurality of applications, or a number of available connections.

13. The computer-implemented method of claim 5, further comprising:
   determining that an identified process is at least one of operating in an unexpected manner or orphaned with respect to applications executing on the computing device; and
   performing at least one termination action with respect to the identified process independent of whether a current operational parameter of the computing device is outside a specified range.

14. The computer-implemented method of claim 5, further comprising:
   determining that an operational parameter of the computing device is outside a specified range before determining the first termination action.

15. A computing device, comprising: at least one processor; and
   memory including instructions that, when executed by the at least one processor, cause the computing device to:
   determine, based at least in part upon event data and application-related data for the computing device, that a first probability that a first application will be accessed on the computing device over a period of time is below a determined value;
   determine a first termination action that is capable of being performed with respect to the first application;
   determine, based at least in part upon the event data and the application-related data, a second probability that a second application will be accessed on the computing device;
   determine a second termination action that is capable of being performed with respect to the second application;
   determine to perform the first termination action before the second termination action based at least in part upon a ranking of the first probability and the second probability, the first probability corresponding to a lower ranking than the second probability, a probability of the first termination action impacting a third application executing on the computing device, and a probability of the second termination action impacting the third application; and
   perform the first termination action on the computing device prior to performing the second termination action.

16. The computing device of claim 15, wherein:
   the event data corresponds to one or more tasks performed by the computing device, the one or more tasks including at least one of launching an application, closing an application, minimizing an application, maximizing an application, activating a screen, causing the computing device to enter a sleep state, or waking the computing device from a sleep state; and
   the application-related data corresponds to one or more activities being performed via the computing device, the one or more activities including at least one of acquiring an image, navigating an interface, accessing a home screen, opening a navigation panel, adjusting a volume, installing application data, downloading an application or content, causing related device activity, or moving between locations.

17. The computing device of claim 15, wherein the instructions further cause the computing device to:
   determine not to perform a third termination action based at least in part upon at least one of the event data or the application-related data.

18. The computing device of claim 15, wherein the instructions that cause the computing device to perform the first termination action further include instructions to perform a respective first termination action on each application of a set of applications least likely to be accessed.

* * * * *